US009850808B2

(12) United States Patent
Kare et al.

(10) Patent No.: US 9,850,808 B2
(45) Date of Patent: Dec. 26, 2017

(54) ADJUSTMENT OF ENGINE OPERATING CONDITIONS

(71) Applicant: Elwha LLC, Bellevue, WA (US)

(72) Inventors: Jordin T. Kare, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 126 days.

(21) Appl. No.: 14/335,148

(22) Filed: Jul. 18, 2014

(65) Prior Publication Data

US 2016/0017790 A1    Jan. 21, 2016

(51) Int. Cl.
*F02B 29/04* (2006.01)
*F02D 41/00* (2006.01)
*F02M 31/04* (2006.01)
*F02D 41/18* (2006.01)

(52) U.S. Cl.
CPC ....... *F02B 29/0493* (2013.01); *F02M 31/042* (2013.01); *F02D 41/0002* (2013.01); *F02D 41/18* (2013.01); *F02D 2200/0406* (2013.01); *F02D 2200/101* (2013.01); *Y02T 10/126* (2013.01); *Y02T 10/146* (2013.01); *Y02T 10/42* (2013.01)

(58) Field of Classification Search
CPC .. F02D 41/00; F02D 41/0002; F02D 41/0007; F02D 41/3035; F02D 2200/0406; F02B 29/04; F02B 29/0493; F02M 31/04; F02M 31/042

USPC ......... 701/101–105, 113, 115; 123/399, 543, 123/555, 556, 679, 686, 690, 41.14
See application file for complete search history.

(56) References Cited

U.S. PATENT DOCUMENTS

| | | | |
|---|---|---|---|
| 4,846,136 A | 7/1989 | Phillips | |
| 4,944,260 A | 7/1990 | Shea et al. | |
| 5,076,248 A | 12/1991 | Schatz | |
| 5,094,198 A | 3/1992 | Trotta et al. | |
| 5,996,560 A | 12/1999 | Schechter | |
| 6,273,076 B1* | 8/2001 | Beck | F02B 29/0418 123/562 |
| 6,564,545 B1 | 5/2003 | Dong | |
| 7,100,584 B1 | 9/2006 | Bruestle et al. | |
| 8,474,241 B2 | 7/2013 | Baron et al. | |
| 2005/0087155 A1* | 4/2005 | Kikori | F02B 75/041 123/78 C |
| 2007/0125346 A1* | 6/2007 | Vetrovec | F02B 33/40 123/563 |
| 2008/0022972 A1* | 1/2008 | Shimo | F02D 41/005 123/445 |
| 2009/0070011 A1* | 3/2009 | Takamiya | F02D 13/0226 701/103 |

(Continued)

*Primary Examiner* — John Kwon
*Assistant Examiner* — Johnny H Hoang
(74) *Attorney, Agent, or Firm* — Foley & Lardner LLP

(57) ABSTRACT

A vehicle includes an internal combustion engine, an air intake coupled to the internal combustion engine and configured to intake air and supply the air to the engine, a temperature controller coupled to the air intake and to the internal combustion engine, and a control system coupled to the air intake, the internal combustion engine, and to the temperature controller. The control system being configured to receive engine operating data and control a temperature of the air via operation of the temperature controller to control an operating condition of the engine.

28 Claims, 6 Drawing Sheets

(56) References Cited

U.S. PATENT DOCUMENTS

| | | | | |
|---|---|---|---|---|
| 2009/0259388 A1* | 10/2009 | Vetrovec | ................ | F02B 33/40 701/103 |
| 2010/0114462 A1* | 5/2010 | Gibson | .............. | F02D 41/0002 701/113 |
| 2010/0211287 A1* | 8/2010 | Ohtsuka | ................. | F02D 41/00 701/102 |
| 2011/0320104 A1* | 12/2011 | Sellnau | ................ | F02D 35/023 701/103 |
| 2013/0253758 A1* | 9/2013 | Nishi | ...................... | F01P 11/16 701/30.5 |
| 2014/0032080 A1* | 1/2014 | Gehrke | ................ | F02D 41/402 701/104 |
| 2014/0318514 A1* | 10/2014 | Pursifull | ............. | F01M 13/022 123/568.29 |
| 2016/0032851 A1* | 2/2016 | Idogawa | ............ | F02D 41/3076 701/102 |

* cited by examiner

ADJUSTMENT OF ENGINE OPERATING CONDITIONS

BACKGROUND

Internal combustion engines can be used for a variety of applications, such as powering automobiles, airplanes, and boats. Many of these applications require operating under different loads and constraints. Typically, however, the engine requires a fuel. The fuel is usually combusted with air in order to power the engine. Different types of fuel and different combinations of fuel and air can cause a variety of different engine operating characteristics.

SUMMARY

One embodiment relates to a vehicle comprising an internal combustion engine, an air intake coupled to the internal combustion engine and configured to intake air and supply the air to the engine, a temperature controller coupled to the air intake and to the internal combustion engine, and a control system coupled to the air intake, the internal combustion engine, and to the temperature controller. The control system is configured to receive engine operating data and control a temperature of the air via operation of the temperature controller to control an engine operating condition.

Another embodiment relates to an internal combustion engine system. The internal combustion engine system includes an air intake coupled to the internal combustion engine and configured to intake air and provide the air to the internal combustion engine, a temperature controller coupled to the air intake and the internal combustion engine, and a control system coupled to the temperature controller, air intake, and the internal combustion engine. The control system is configured to receive engine operating data and control a temperature of the air via operation of the temperature controller to control an engine operating condition.

Still another embodiment relates to an internal combustion engine system. The internal combustion engine system includes an air intake coupled to the internal combustion engine and configured to intake air and provide the air to the internal combustion engine; a temperature controller coupled to the air intake and the internal combustion engine, wherein the temperature controller includes a compressor and a heat exchanger; and a control system coupled to the temperature controller, air intake, and the internal combustion engine. The control system is configured to receive engine operating data and control a temperature of the air via operation of the temperature controller to control an engine operating condition.

Yet another embodiment relates to a method for controlling an operating condition of an internal combustion engine, comprising receiving an operating preference of the engine, receiving engine operating data, determining an internal combustion engine speed based on the operating preference and the engine operating data, determining a charge air temperature based on the operating preference and the engine operating data, and providing a control signal to a temperature controller to provide air to the internal combustion engine at the determined charge air temperature.

Another embodiment relates to a method of controlling a power output from an internal combustion engine, comprising receiving engine operating data and adjusting a charge air temperature using a heat exchanger based on the engine operating data and the operating preference while maintaining a substantially constant internal combustion engine speed.

Still another embodiment relates to a system for controlling intake air temperature in an internal combustion engine. The system includes a temperature controller and a control system coupled to the temperature controller, wherein the control system is configured to receive operating data for the internal combustion engine, receive an operating preference for the engine, and control operation of the temperature controller based on the data and the operating preference.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
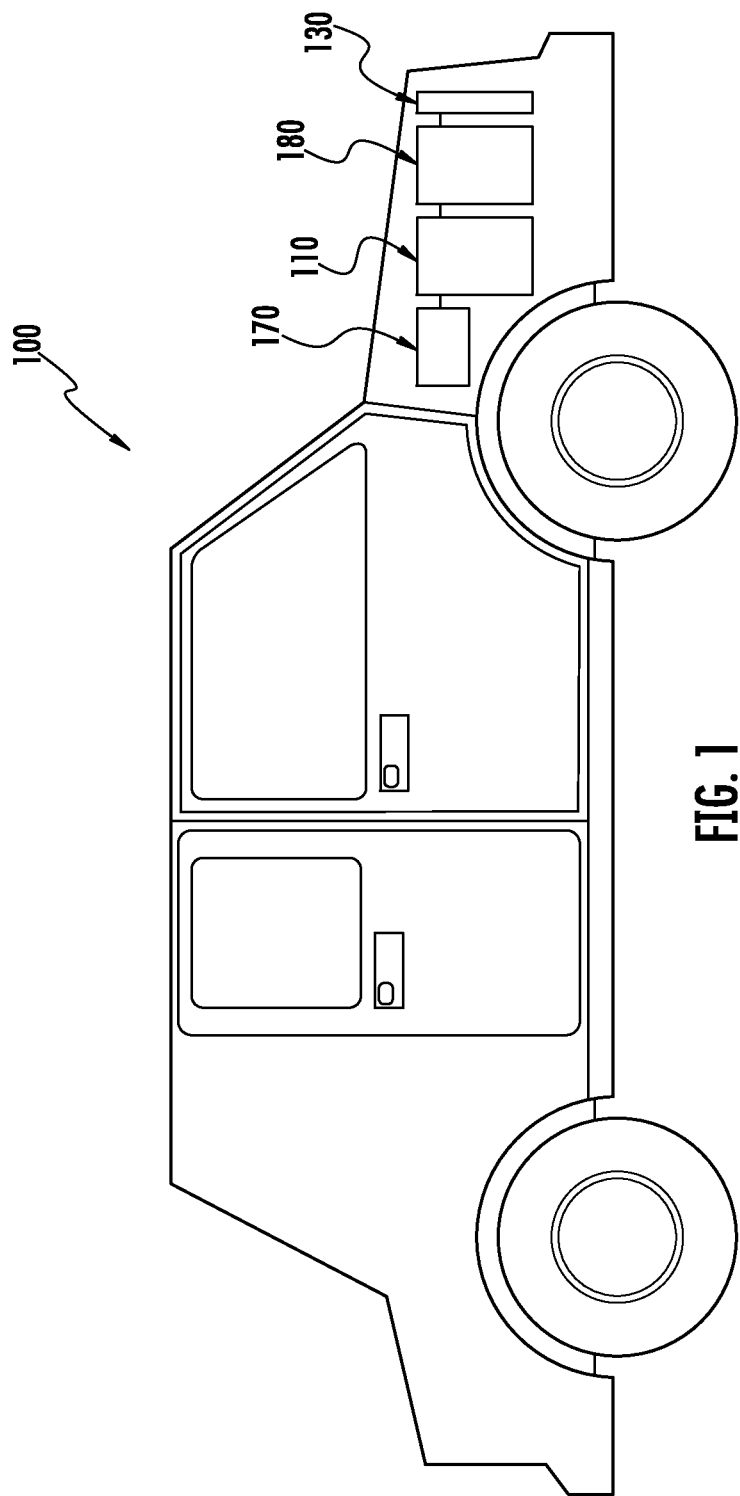
FIG. 1 is a view of a vehicle according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, systems and methods for varying the charge air (i.e., input or intake air) temperature of an internal combustion engine are shown according to various embodiments. In typical operation, an internal combustion engine receives a chemical energy input (e.g., fuel such as gasoline, diesel, jet-fuel, etc.) and produces a mechanical energy output. The chemical energy input is usually combusted with air to provide the output mechanical power (e.g., a rotating shaft in a reciprocating engine). Typically, the fuel is mixed with air in order for combustion to occur. Adjusting the air temperature adjusts the density of the air. Typically, the lower the air temperature equates to a higher density of the air. Relatively higher density air occupies less volume than relatively lower density air in a cylinder of an internal combustion engine. As such, a relatively greater mass of fuel can be burned in the cylinder using lower temperature, higher density air. Increasing the amount of fuel burned increases the chemical energy input, which in turn increases the available power for the engine. As described more fully herein, by adjusting the temperature of intake air, many engine operating conditions can be controlled and adjusted. Please note that although several of the embodiments described herein relate to internal combustion engines in a vehicle, this disclosure is applicable to a variety of internal combustion engine applications (e.g., a generator).

Referring now to FIG. 1, vehicle 100 is shown according to one embodiment. Vehicle 100 includes internal combustion engine 110, air intake 130, transmission 170, and temperature controller 180. In this example, vehicle 100 is shown as an automobile. However, as mentioned above, the present disclosure relates to various other vehicles including buses, airplanes, boats, snowmobiles, motorcycles, etc. In general, vehicle 100 is configured such that the air intake temperature (also referred to herein as "charge air temperature" and "intake air temperature") is controlled and varied in order to achieve a desired power output, emissions characteristic, fuel economy, and/or engine efficiency.

According to one embodiment, internal combustion engine 110 can operate over a range of output powers at a fixed engine speed (i.e., revolutions-per-minute) primarily by varying the charge air temperature. Engine 110 can include a two-stroke engine; a four-stroke engine (Otto cycle); a spark ignition engine; a diesel engine (compression-ignition); an Atkinson cycle engine; a Miller cycle engine; and/or a homogenous charge compression ignition engine ("HCCI"). Engine 110 may be a linear piston type engine, a rotary engine such as a Wankel engine, or other type of internal combustion engine configuration. Engine 110 can operate using a wide range of fuels including gasoline (at a wide range of octane ratings, e.g., 87 and 93), diesel fuel, bio-diesel fuel, flexible fuels (e.g., compressed natural gas, liquefied petroleum gas, hydrogen, E85), cryogenic fuels (e.g., liquid methane), etc.

Figure 2:
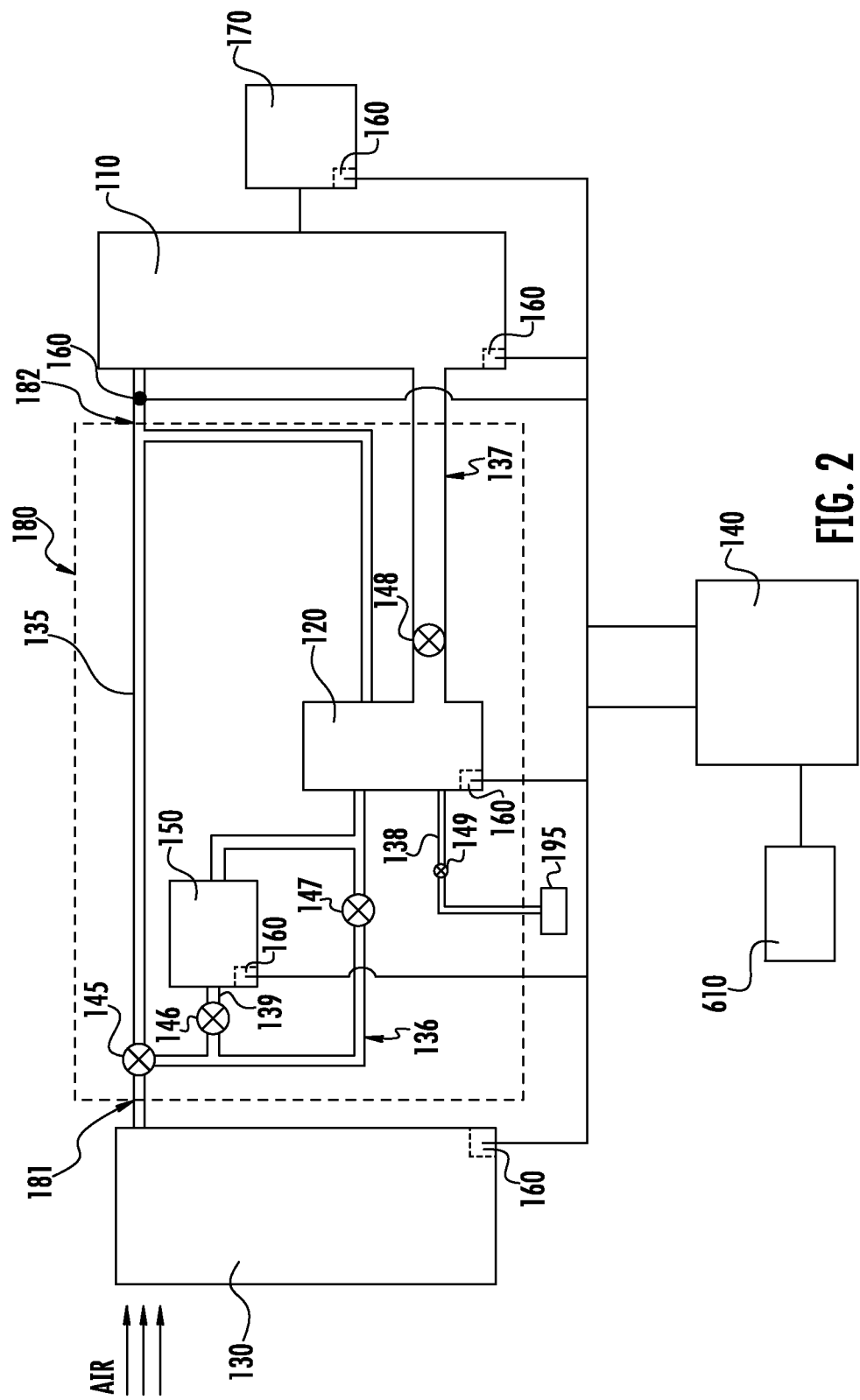
FIG. 2 is a diagram of an air intake and a temperature regulator system coupled to an engine in a vehicle according to one embodiment.
Figure 3:
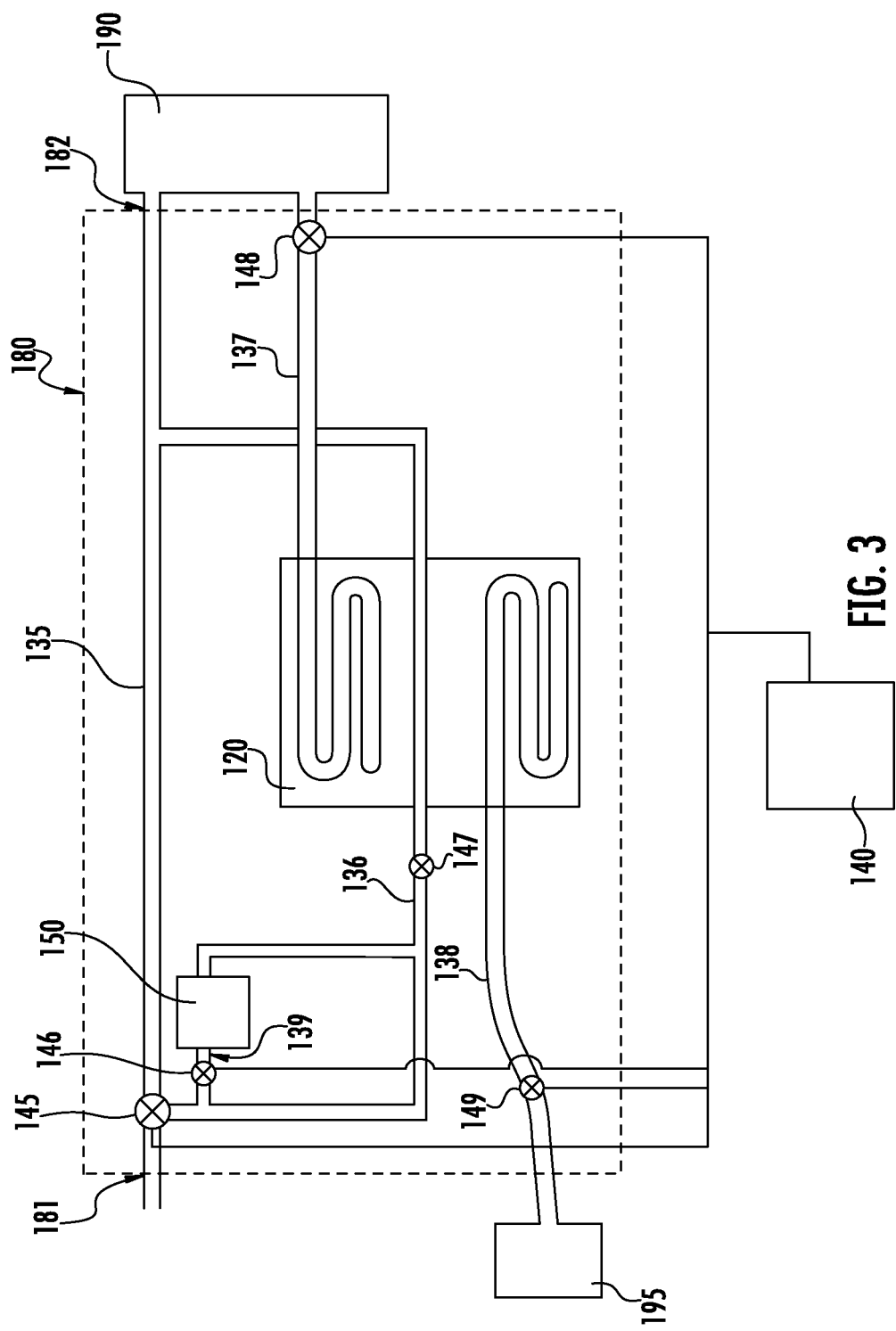
FIG. 3 is a diagram of a temperature regulator system for a vehicle according to one embodiment.

Referring to FIG. 2 generally, air is received by air intake 130 and directed to engine 110 via temperature controller 180. Air intake 130 typically includes an air filter configured to remove unwanted debris and particles from the intake air. Within temperature controller 180, air is directed to travel through bypass duct 135 to engine 110, or alternatively, to travel through temperature adjustment duct 136 to engine 110. Air directed through temperature adjustment duct 136 eventually enters heat exchanger 120 and can, in some embodiments, pass through compressor 150 via compressor duct 139 prior to entering heat exchanger 120. After passing through temperature adjustment duct 136 and/or bypass duct 135, the air is provided to engine 110 (e.g., an engine cylinder) and used for combustion with a fuel (e.g., 87 octane gasoline). Although FIG. 2 depicts bypass duct 135 and temperature adjustment duct 136 merging prior to entering engine 110, in some embodiments, bypass duct 135 and temperature adjustment duct 136 can enter engine 110 separately. FIGS. 2-3 are not meant to be limiting as to the configuration of the components of temperature controller 180, such that a wide variety of arrangements are possible.

Referring to FIG. 2 more particularly, various components of vehicle 100 will now be discussed in greater detail. Sensors 160 acquire data regarding operation of engine 110, vehicle 100, and components of temperature controller 180. Sensors 160 can include temperature and pressure sensors, oxygen sensors, mass air flow sensors, fuel sensors, air-to-fuel sensors, knock sensors, engine speed sensors, vehicle speed sensors, camshaft position sensors, crankshaft position/cylinder position sensors, and/or throttle position sensors. The particular depiction of sensors 160 in FIG. 2 is not meant to be limiting, such that sensors 160 can be placed on vehicle 100, engine 110, heat exchanger 120, air intake 130, compressor 150, transmission 170, or other components of vehicle 100 (e.g., an electronic control module) in a multitude of various configurations using several different types of sensors.

As mentioned above, the acquired data can include engine operating data, vehicle operating data, and temperature controller data. Engine operating data can include an indication of the speed of the engine (RPM); likelihood of knock; compression ratio; fuel type; air-to-fuel ratios; power output; charge air temperature and pressure; absolute manifold pressure; ambient air temperature and pressure; etc. Engine operating data can further include data related to air intake 130, such as an indication of: air intake pressure and temperature and mass air flow of intake air. Temperature controller data can include data related to heat exchanger 120, such as an indication of: mass air flow through heat exchanger; inlet air temperature and pressure; outlet air temperature and pressure; mass of heat exchanger fluid flow; inlet/outlet temperature and pressure of heat exchanger fluid; etc. Temperature controller data can also include data related to compressor 150, such as an indication of: compressor inlet air temperature and pressure; compressor outlet air temperature and pressure; and mass air flow rate. Temperature controller data can further include data related to valves 145, 146, 147, 148, and 149, such as an indication of whether the valves are open, closed, or partially opened; fluid and air flow rates through the valves; and whether the valves are functioning correctly. Moreover, the acquired data can include data related to vehicle 100, such as an indication of the load on the vehicle (e.g., rolling resistance, drag resistance, etc.) and the vehicle speed.

According to one embodiment, sensor 160 transmits the acquired data to control system 140. In one embodiment, sensor 160 communicates with control system 140 via wireless protocols. Wireless protocols can include Wi-Fi, wireless local area network ("WLAN"), Bluetooth, radio frequency ("RF"), optical communication, infrared, microwave, sonic and ultrasonic waves, and electromagnetic induction communications platforms. According to another embodiment, sensor 160 can transmit the data to control system 140 using wired protocols including fiber-optics, universal serial bus ("USB"; including all micro, mini, and standard types), twisted-pair cables, and coaxial cables.

In addition to receiving the engine operating data, temperature controller data, and vehicle operating data, control system 140 may also receive at least one vehicle operating preference from an operator of the vehicle and/or a user via operator input/output device 610. Operator input/output device 610 may be located on vehicle 100 and/or remote from vehicle 100. Vehicle operating preferences may include engine operating preferences, such as a fuel economy, an emissions characteristic, and an engine power output. For example, if vehicle 100 encounters a steep grade, the operator may desire to keep vehicle 100 moving at a constant speed. As a result, the operator can provide an input, such as depressing an accelerator pedal, to increase the power output. In some embodiments, control system 140 receives the operator input and adjusts the charge air temperature in order to achieve the power output preference at a substantially constant engine speed. Operating preferences may be inputted into control system 140 by a user or an operator prior to the vehicle starting (e.g., a desired fuel economy for the upcoming vehicle operation duration), after the vehicle is started, and/or while it is moving. Typically, the operator preference is a weighted preference. Because changing the charge air temperature affects combustion characteristics, which, for example, may affect more than just power output (i.e., emissions characteristics), it may not always be possible to just achieve a preferred power output. Additionally, changing the charge air temperature may not be sufficient to achieve a desired combination of engine power or torque and engine speed. Or, alternatively, changing the charge air temperature may be able to achieve a desired combination, but may result in one or more undesirable effects such as reduced fuel efficiency or increased emissions as briefly stated above. Accordingly, operator input/output device 610 may provide the operator with a message like: "I understand you would like to output X power. However, outputting X power at this engine speed will increase nitrogen oxide emissions by Y percent. Would you like to proceed?" In another embodiment, input/output device 610 may provide a graphical indication, e.g., of one or more engine or vehicle parameters such as NOx emission or percentage of input heating/cooling capability used, or one or more analog or binary indicators, such as an "excess emissions" or "excess intake temperature" warning light. The operator may then take action to adjust his or her inputs or operating preferences for the engine. Information about operating conditions may also be stored by the control system for later display and/or analysis.

Referring next to FIG. 3, temperature controller 180 is shown according to one embodiment. In some embodiments, temperature controller 180 can include heat exchanger 120, compressor 150, bypass duct 135, temperature adjustment duct 136, heating duct 137, cooling duct 138, and compressor duct 139. In other embodiments, temperature controller 180 may include only some of the aforementioned components. According to one embodiment, heat exchanger 120 can include various types of heat exchangers, such as: parallel flow, open flow (e.g., an intercooler), countercurrent flow, and cross flow heat exchanger flow configurations. Depending on the application that engine 110 with temperature controller 180 system is used in, the heat exchanger configuration may vary. In some applications, more than one heat exchanger may be used with each heat exchanger taking on a different configuration (e.g., a parallel flow heat exchanger coupled with a countercurrent flow heat exchanger). Heat exchanger 120 can further include many different heat exchanger types as well, including: shell and tube, plate, regenerative, microchannel, and adiabatic wheel heat exchangers.

Referring more particularly to FIG. 3, heat exchanger 120 includes a working fluid that exchanges heat with the intake air. The working fluid can be supplied from one or both of cooling source 195 and heating source 190 via cooling duct 138 and heating duct 137, respectively (e.g., via control of valves 148, 149). Cooling duct 138 is coupled to cooling source 195, and heating duct 137 is coupled to heating source 190. Air entering temperature controller 180 from controller input 181 can be directed to one or both of bypass duct 135 or temperature adjustment duct 136 (e.g., by actuation of valve 145). Bypass duct 135 guides the intake air directly to engine 110. Air travelling through temperature adjustment duct 136 can be directed to heat exchanger 120, or alternatively, be directed to heat exchanger 120 via compressor 150 (e.g., by actuation of valve 146). Air exiting heat exchanger 120 is combined with air from bypass duct 135 (if a portion of the intake air was directed through bypass duct 135) at controller output 182. Upon exiting controller output 182, the intake air then enters engine 110. According to one embodiment, the heating and/or cooling fluids are interconnected with the engine (e.g., the heating fluid can include exhaust gases). According to an alternative embodiment, the heating fluid and/or cooling fluid are independent from the engine and vehicle, such that heat exchanger 120 includes its own fluid(s) dedicated to only adjusting the charge air temperature.

According to one embodiment, all or a portion of the intake air is directed through bypass duct 135 via valve 145. Control system 140 can actuate valve 145 to direct all or a portion of intake air through bypass duct 135. For example, intake air temperature may be at the necessary temperature to provide a desired engine operating condition. As such, control system 140 will not actuate valve 145 to direct (all or a portion of the) intake air through temperature adjustment duct 136. Rather, control system 140 will actuate valve 145 to direct all the intake air directly to engine 110.

According to another embodiment, all or a portion of the intake air is directed through temperature adjustment duct 136 (i.e., heat exchanger 120). When the working fluid includes a heating fluid, the heating fluid passes through heating duct 137 to heat exchanger 120 to add heat to the intake air. The heating fluid is supplied by heating source 190. According to one embodiment, heating source 190 includes engine 110, such that the heating fluid that adds heat to the air includes: exhaust gases; engine coolant; and heated air from the engine. According to another embodiment, an intermediate fluid is the heating fluid that adds heat to the intake air. For example, exhaust gases may transfer heat to a lubricant, which is then directed through heat exchanger 120 to transfer heat to the intake air (i.e., the lubricant transfers heat it received from the exhaust gases to the intake air). Control system 140 can actuate valve 148 to control the flow of heating fluid to heat exchanger 120 (e.g., intake air temperature may need to be increased rapidly, such that control system 140 actuates valve 140 fully open to allow for a relatively large proportion of heating fluid to flow into heat exchanger 120 and add heat to the intake air). Accordingly, control system 140 via actuation of one or more valves in temperature controller 180 can control the amount and rate of heating fluid (and intake air) going through heat exchanger 120 to precisely control the intake air temperature at controller output 182.

In comparison, when the working fluid is a cooling fluid, the cooling fluid passes through cooling duct 138 to heat exchanger 120 (via actuation by control system 140 of one or more valves), which removes heat from the intake air. Cooling source 195 supplies cooling fluid to heat exchanger 120. According to one embodiment, cooling source 195 includes evaporator coils from an air conditioning system on a vehicle, such that the heat exchanger cooling fluid includes cool air from the evaporator coils. Alternatively, cooling source 195 can include an air conditioning system dedicated for use by temperature controller 180. In some embodiments, cooling source 195 can include fuel used for engine 110. For example, if engine 110 uses a cryogenic fuel (e.g., liquid methane), the fuel can be circulated through heat exchanger 120 to cool intake air prior to the fuel being used for combustion in engine 110. Accordingly, the cooling fluid can include a refrigerant, cryogenic fuels, ambient air, etc. According to one embodiment, control system 140 can control the amount and flow rate of the cooling fluid to heat exchanger 120 via actuation of valve 149 in cooling duct 138. Typically, control system 140 will initiate intake air cooling (i.e., by directing the air to heat exchanger 120 to exchange heat with a cooling fluid) when compression of the intake air via compressor 150 occurs because compression will result in a relatively higher temperature air. According to some embodiments, the cooling fluid is supplied intermittently in order to provide "bursts" of relatively higher density air to engine 110. For example, if vehicle 100 is an automobile and is attempting to pass another automobile on a highway, engine 110 may need additional power such that higher density air may be needed in order to provide a relatively greater input of fuel to the engine. As such, control system 140 can control the amount and rate of cooling fluid (and intake air) going through heat exchanger 120 in order to achieve a particular intake air temperature for engine 110.

In some embodiments, temperature controller 180 includes compressor 150. According to one embodiment, intake air enters air intake 130 and is directed through compressor 150 (via compressor duct 139) and heat exchanger 120 before entering engine 110. Control system 140 can actuate valve 145 to direct intake air to temperature adjustment duct 136. Control system 140 can also actuate valve 146 in compressor duct 139 to direct intake air to compressor 150. Compressor 150 can include a supercharger, turbocharger, twin turbocharger, etc.

Compressor 150 is configured to compress the intake air to increase its density while decreasing its occupied volume, such that more fuel can be added to a combustion chamber (to increase output power). Compressing the intake air increases the air temperature. The air temperature of the air exiting compressor 150 may not correspond to a needed charge air temperature for engine 110. As such, control system 140 can actuate valves 148, 149 to remove or add heat to the compressed air. Typically, the air exiting compressor 150 will need to be cooled. Using the techniques above (e.g., varying the proportion of air flow through the heat exchanger, using different working fluids, etc.), control system 140 can optimize the charge air temperature to achieve a desired engine operating condition (e.g., power output, emissions characteristic, and/or engine efficiency).

As seen further in FIG. 2 and FIG. 3, temperature controller 180 can also include one or more valves. In the example in FIG. 2 and FIG. 3, temperature controller 180 includes valves 145-149. Valves 145, 146, 147, 148, and 149 may include flow control valves or other suitable flow control devices. The valves can be automatic (e.g., such that a certain air or fluid pressure actuates the opening, closing, or partial opening of the valves) or power driven (e.g., such that the opening, partial opening, or closing of such valve is driven by a power source, such as electricity). The valves can include: ball valves, butterfly valves, check valves, globe valves, knife valves, gate valves, multi-directional valves, stopcock valves, pinch valves, or any other suitable fluid flow control device or mechanism. According to one embodiment, the valves are actuated based on commands from control system 140. According to an alternative embodiment, the valves are automatic flow valves, such that direction and proportion of fluid and intake air flow are regulated by valve actuation based on preselected valve settings independent of control from control system 140. Furthermore, the depiction of the valves in FIGS. 2-3 is not meant to be limiting as to either the placement of such valves and/or the number of valves included in temperature controller 180.

As mentioned above, temperature controller 180 also includes one or more ducts. In the examples in FIGS. 2 and 3, temperature controller 180 includes bypass duct 135, temperature adjustment duct 136, and compressor duct 139. Bypass duct 135, temperature adjustment duct 136, and compressor duct 139 are configured to direct intake air through temperature controller 180. Heating duct 137 and cooling duct 138 are configured to provide heat exchanger fluids (i.e., a heating fluid in heating duct 137 and a cooling fluid in cooling duct 138) to heat exchanger 120 to either add or remove heat from the intake air. Bypass duct 135, temperature adjustment duct 136, heating duct 137, cooling duct 138, and compressor duct 139 can include any air-tight/aqueous fluid-tight conduits capable of sustaining exposure to the high temperature engine components in a vehicle. Moreover, the aforementioned ducts can include flexible hoses, pipes, tubes, etc.

According to one embodiment, all or a portion of the intake air is directed through heat exchanger 120 and compressor 150. Control system 140 can actuate valve 145 to direct intake air to temperature adjustment duct 136. Control system 140 can actuate valve 146 to direct the intake air in temperature adjustment duct 136 to compressor duct 139 and, subsequently, compressor 150. According to one embodiment, while control system 140 actuates valve 146, control system 140 closes valve 147, such that all of the intake air directed to temperature adjustment duct 136 enters compressor 150. In another embodiment, control system 140 can actuate valves 146 and 147, such that a portion of the intake air enters only compressor 150 and another portion of air enters only heat exchanger 120.

Control system 140 is configured to control the charge air temperature based on a desired engine operating condition. Engine operating conditions can include a power output, engine efficiency, an emissions characteristic, a fuel economy, etc. To achieve various charge air temperatures corresponding with desired engine operating conditions, control system 140 can increase or decrease the amount of working fluid flowing through heat exchanger 120 by controllably opening and closing one or more valves. For example, if engine power requirements decrease, control system 140 can actuate valve 145 in bypass duct 135 to direct air through temperature adjustment duct 136 and actuate valve 148 in heating duct 137 to allow for the intake air to only gain heat from the heating fluid prior to entering engine 110. In this scenario, control system 140 would actuate valve 149 in cooling duct 138 to prevent the removal of heat from the intake air.

Furthermore, according to another embodiment, control system 140 can actuate valves 148, 149 to control the amount of heating and cooling fluid flowing through heat exchanger 120. For example, control system 140 may actuate valve 148 fully in heating duct 137 while actuating valve 149 in cooling duct 138 only partially (e.g., half-open) in order to effect a specific charge air temperature. In another embodiment, control system 140 may vary the proportion of intake air flow through heat exchanger 120 through valve 145 in bypass duct 135. For example, in order to achieve a desired air temperature (for a specific power output or emission characteristic), a portion of air may flow through bypass duct 135 while another portion of air flows through temperature adjustment duct 136. When the two portions of air flow combine (e.g., in the configuration example in FIG. 2, temperature adjustment duct 136 joins bypass duct 135 before engine 110) at controller output 182, the charge air temperature will correspond with, for example, a specific power output. Thus, the charge air temperature can be adjusted by varying the proportion and rate of air flow through heat exchanger 120, by varying the amount and rate of working fluid (e.g., heating and/or cooling fluid) flowing through heat exchanger 120, and/or by varying the type of fluid that flows through heat exchanger 120 (e.g., only using the heating or cooling fluid). These techniques can be used in any suitable combination to achieve the desired engine operating condition.

One engine operating condition that can be adjusted and controlled is engine power output. Power output from an engine is a function of engine speed multiplied by engine torque:

Power (horsepower)=Torque (ft-lbf)*Engine Speed (RPM)/5252

If engine speed is held constant, torque can be adjusted to vary engine 110 power output. By increasing the amount of fuel and air added to a combustion chamber, the volume of combustion gases produced increases, which increases the torque produced. For example, by lowering the temperature of the intake air, the density increases and more air (and, consequently, fuel) are able to be combusted, which increases the volume of gases. The relatively greater volume of gases exerts a relatively higher pressure on for example a piston in the engine cylinder, which generates a relatively higher torque output. As such, power output can be varied by adjusting the charge air temperature at a constant or substantially constant engine speed. Accordingly, by adding heat to or removing heat from the intake air, the density of the air is changed to allow for more or less air to be added to an engine (and, consequently, fuel). In turn, throttling the intake air to control the power produced is minimized. Therefore, throttling losses and inefficiencies are also minimized.

Another engine operating condition that can be controlled and adjusted is emissions characteristics. As mentioned above, by changing the temperature of the intake air, the density of the air is also changed. Changing the mass of air provided to a cylinder or similar combustion chamber can change the air-to-fuel ratio of such cylinder. For example, if charge air burns at stoichiometric air-to-fuel conditions within a cylinder in engine 110, all the fuel will be burned with no excess air. Stoichiometric conditions for a gasoline spark-ignition engine are typically 14.7:1 (i.e., 1 gram of fuel is needed for every 14.7 grams of air). A lean air-to-fuel ratio is typically greater than 14.7:1 (e.g., 15.0:1). A rich air-to-fuel ratio is typically less than 14.7:1 (e.g., 13.0:1). At each of these ratios, different engine operating conditions exist. Because more air (i.e., more oxygen) is present in lean conditions, the production of nitrogen oxides is increased. In comparison, in rich conditions, less oxygen is present such that hydrocarbon emissions (resulting in no or reduced oxidation due to lack of oxygen in rich conditions) are increased. In addition to the particular air-to-fuel ratio, the combustion temperature also affects emission characteristics. For example, typically, the higher the combustion temperature, the higher the nitrogen oxide emissions. Accordingly, control system 140 can direct the adjustment of intake air temperature to correspond with a combustion temperature that creates a desired emission characteristic.

Although stoichiometric conditions may be ideal in some situations (e.g., low emissions), stoichiometric conditions will not always produce a desired or a required power output. For example, slightly rich conditions (e.g., 12.8:1) typically produce optimal power ratios for engines because slightly rich conditions ensure that all of the air is used for combustion with the fuel. In another example, an operator may desire an increase in fuel economy rather than power output. Leaner ratios may be required to increase fuel economy (because less fuel is being burned). The leaner ratio ensures that all of the fuel is combusted (which prevents fuel waste) because sufficient air is present to support combustion of all of the fuel.

In addition to adjusting the charge air temperature to achieve a desired power output and emissions characteristic, adjusting the charge air temperature can also adjust engine efficiency (i.e., another engine operating condition). As heat is a form of energy, by transferring heat from exhaust gases directly or indirectly (e.g., indirectly via an intermediate fluid) to the intake air, energy that otherwise would have been lost is being recovered and recycled. In turn, the efficiency of the engine can be increased. However, in some embodiments, a cooler intake air temperature may be necessary such that little, if any, exhaust gas energy is recovered. As such, as mentioned above, improving engine efficiency (like other desired engine operating conditions) in most situations may be a weighted combination of, for example, sacrificing power output in exchange for engine efficiency.

Figure 4:
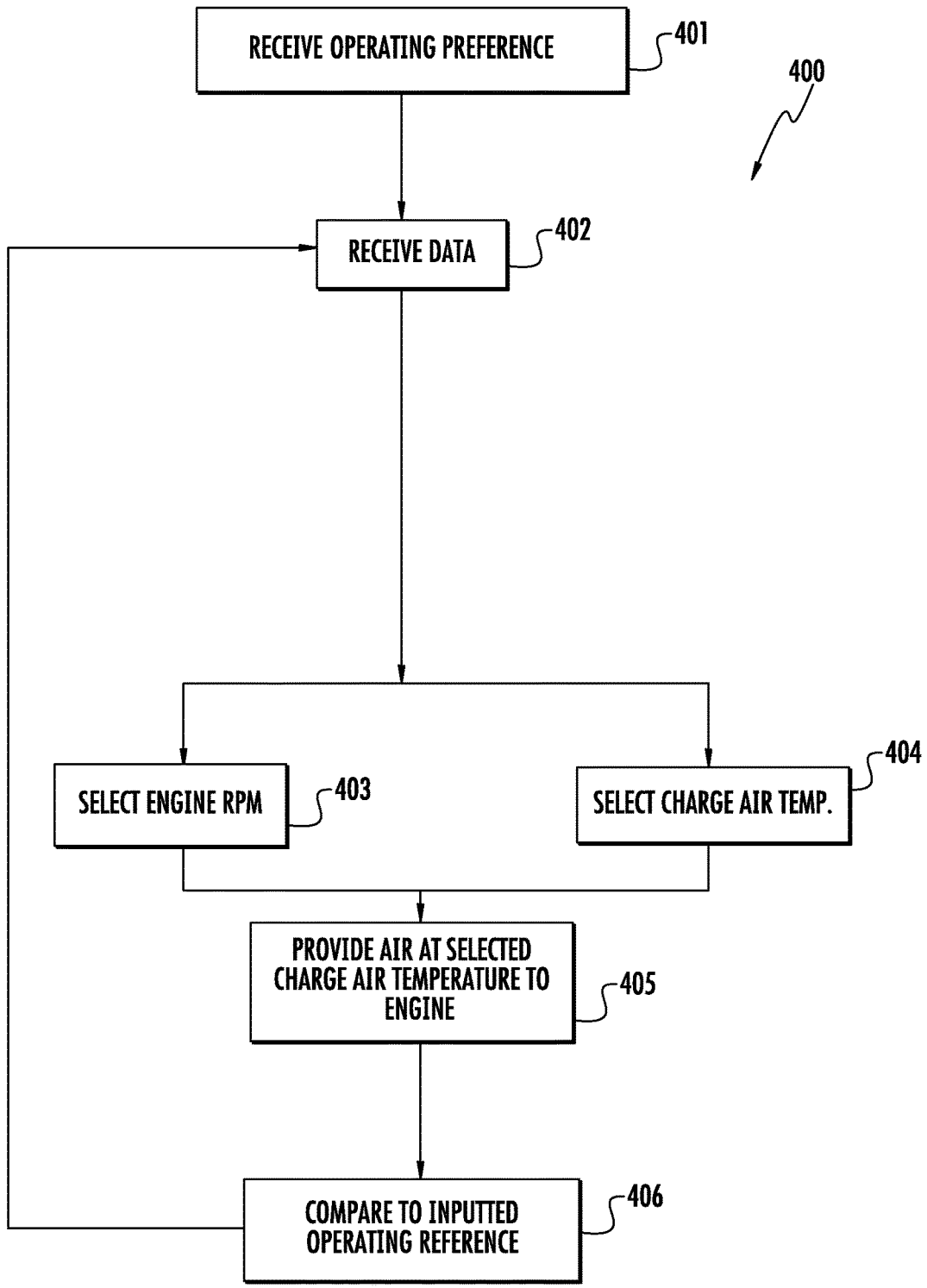
FIG. 4 is a diagram of a method of adjusting a charge air temperature in an engine according to one embodiment.

Referring now to FIG. 4, method 400 for controlling an engine operating condition of an internal combustion engine is shown according to one embodiment. Engine operating conditions can include a power output, an emissions characteristic, and/or engine efficiency. A control system receives an operating preference from a user, operator, and/or manufacturer (401). Operating preferences include engine operating preferences, such as a power output, emissions characteristic, etc. The control system receives data regarding operation of the engine using at least one sensor (402). The sensor can include the sensor types and perform the sensor functions described above. Engine operating data can include any of the data listed above, such as engine speed (RPM), air-to-fuel ratio, charge air temperature and pressure, ambient air temperature and pressure, engine temperature, likelihood of engine knock, compression ratio, ignition timing, fuel consumption rate (e.g., miles-per-gallon), etc. Moreover, the data can include data regarding one or more components above, such as a heat exchanger, air intake, and temperature controller. The acquired data is processed in regard to the identified engine operating preference. According to one embodiment, an engine speed (403) and a charge air temperature (404) are selected by the control system in order to achieve or partially achieve the identified engine operating preference. The intake air is provided to the engine at the selected charge air temperature (405). This can be accomplished via a control signal from the control system to a vehicle's temperature controller (i.e., actuating one or more valves). After the engine speed and charge air temperature are selected, the control system will compare the resultant engine operating data to the identified engine operating preference in order to ensure that the engine operating preference is being achieved (406). Method 400 can be configured to operate continuously while the engine is in operation. As such, an operator can continuously modify their operating preferences.

For example, assume method 400 is implemented in a vehicle, such as an automobile, and an operator chooses a particular vehicle speed to be maintained. The control system, based on the acquired data, can determine that "x" power output is required from the engine in order to maintain the speed. Based on the current engine operating data, the control system determines that engine speed will have to be increased by "y" percentage and the charge air temperature will need to be decreased by "z" degrees. According to one embodiment, a temperature controller, such as that described above, is coupled to the control system, such that the control system can increase (or decrease) the charge air temperature that enters the engine by "z" degrees via operation of the temperature controller. This can be accomplished using the techniques described above (e.g., opening, closing, and partially opening valves coupled to the heat exchanger to vary the proportion of air and/or working fluid flowing through the heat exchanger). The control system is configured to continuously calculate and adjust the engine speed and charge air temperature in order to achieve or partially achieve a selected engine operating preference.

Figure 5:
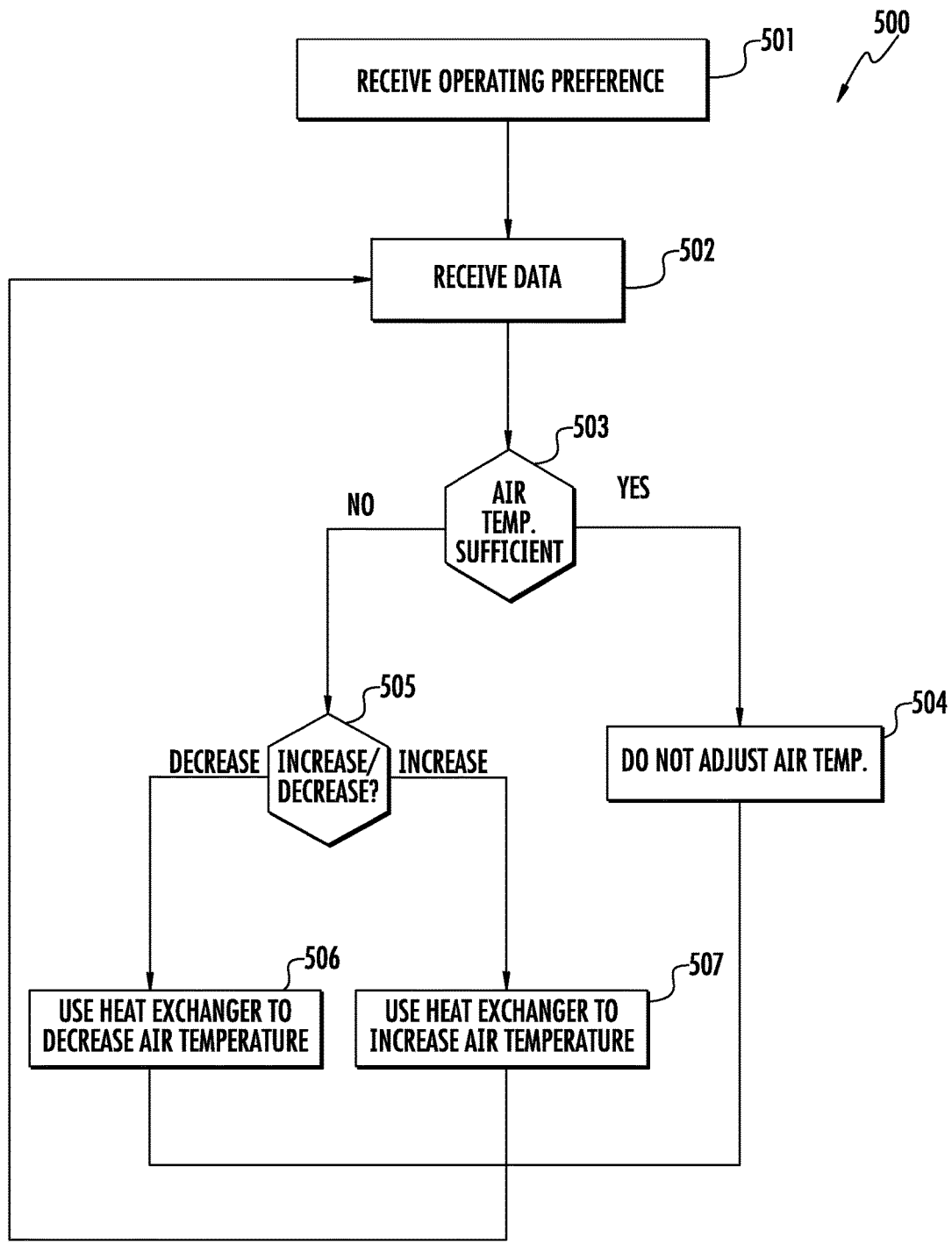
FIG. 5 is a diagram of a method of adjusting a charge air temperature in an engine at a substantially constant engine speed according to one embodiment.

Referring to FIG. 5, a method 500 for adjusting a power output from an engine at a constant or substantially constant engine speed is shown according to one embodiment. An operator and/or user provide an operating preference to a control system (501). Operating preferences can include engine operating preferences, such as fuel economy, an emissions characteristic, and an engine power output. The control system is configured to receive engine operating data like that described above (e.g., engine speed, etc.) (502). The control system determines a required charge air temperature based on the engine operating preference, e.g., engine power output at the constant or substantially constant engine speed. A determination is made as to whether the current charge air temperature will satisfy the selected operating preference, e.g., power output (503). The control system can be configured to not change the charge air temperature if the charge air temperature can achieve the desired preference (504).

If the current charge air temperature will not achieve a selected operating preference, a determination is made as to whether the charge air temperature needs to be increased or decreased in order to achieve the desired engine operating preference (505). According to one configuration, the control system is coupled to a temperature controller configured to heat/cool the air (i.e., increase or decrease the charge air temperature). As such, the control system can employ the same techniques described above for modifying charge air temperature change. For example, the control system can actuate a valve to direct intake air to a heat exchanger. The control system can direct cooling fluid to the heat exchanger to remove heat from the air (506), or alternatively, direct heating fluid to the heat exchanger to add heat to the air (507). Furthermore, the control system can vary the flow of air through the heat exchanger and types of working fluids (e.g., a heating fluid) flowing through the heat exchanger. Method 500 is configured to be run continuously during operating of the engine, such that an operator can input or change their initially selected engine operating preference.

Figure 6:
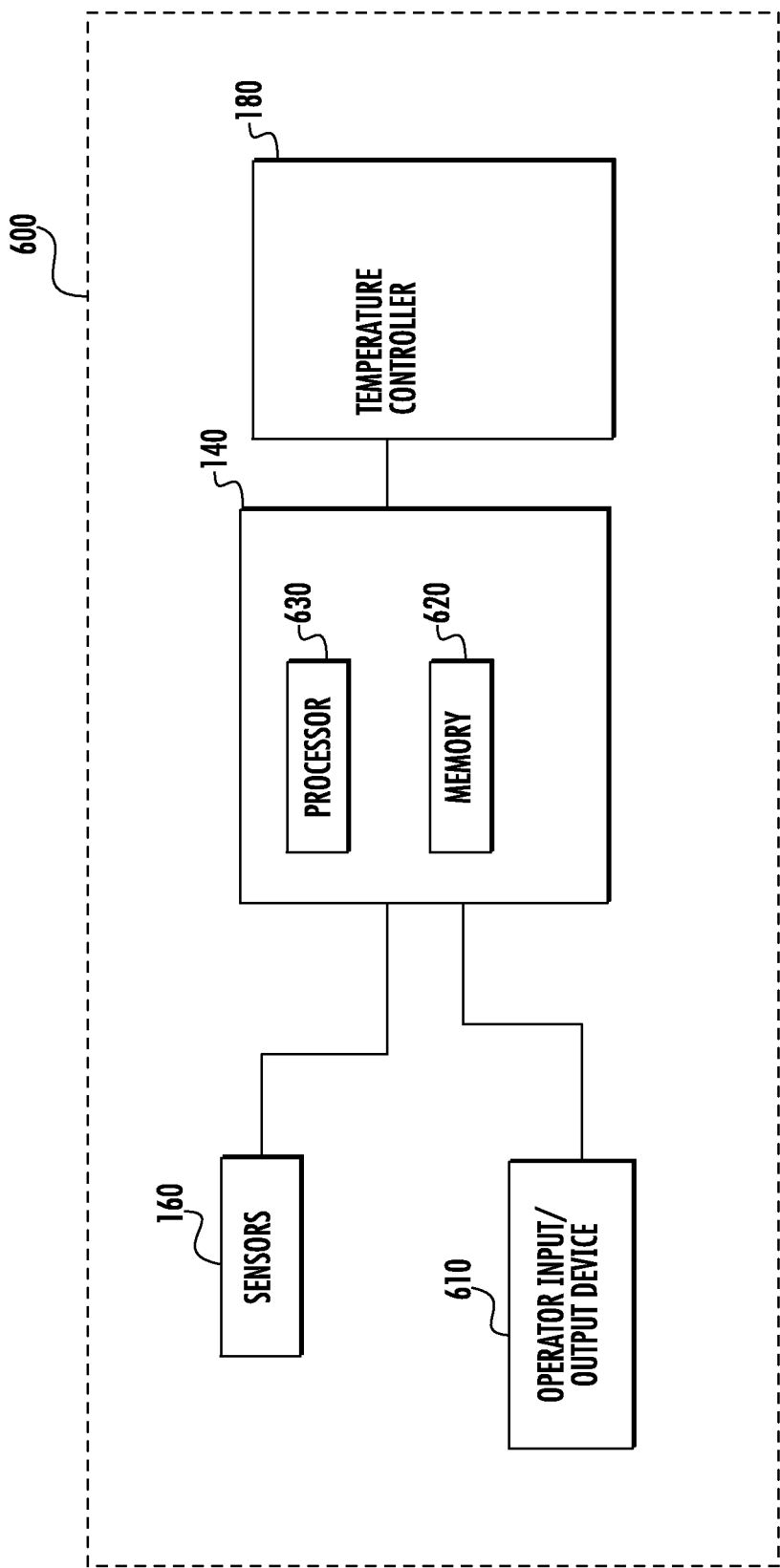
FIG. 6 is a diagram of a control system coupled to a temperature controller according to one embodiment.

Referring to FIG. 6, system 600 for adjusting charge air temperature in an internal combustion engine is shown according to one embodiment. System 600 includes control system 140 and temperature controller 180. Control system 140 includes memory 620 and processor 630. Processor 630 may be implemented as a general-purpose processor, an application specific integrated circuit (ASIC), one or more field programmable gate arrays (FGPAs), a digital-signal-processor (DSP), a group of processing components, or other suitable electronic processing components. Memory 620 is one or more devices (e.g., RAM, ROM, Flash Memory, hard disk storage, etc.) for storing data and/or computer code for facilitating the various processes described herein. Memory 620 may be or include non-transient volatile memory or non-volatile memory. Memory 620 may include database components, object code components, script components, or any other type of information structure for supporting the various activities and information structures described herein. Memory 620 may be communicably connected to processor 630 and provide computer code instructions to processor 630 for executing the processes described herein.

Temperature controller 180 can include heat exchanger 120, compressor 150, bypass duct 135, temperature adjustment duct 136, heating duct 137, cooling duct 138, compressor duct 139, and valves 145, 146, 147, 148, and 149. Control system 140 is configured to control operation of the temperature controller 180 to modify the charge air temperature in order to affect a desired fuel economy or power output of the engine.

Control system 140 receives data from sensors 160. Data can include data related to engine 110, one or more components of temperature controller 180, and/or data regarding a vehicle if the system is implemented in a vehicle. Engine operating data can relate to operating characteristics of an engine of the vehicle, such as: speed of the engine (RPM); likelihood of knock; compression ratio; air-to-fuel ratios; power output; charge air temperature and pressure; absolute manifold pressure; etc. Engine operating data can further include data related to an air intake of the vehicle, such as: air intake pressure and temperature and mass air flow of intake air. Temperature controller data can include data related to heat exchanger 120, such as: mass air flow through heat exchanger; inlet temperature and pressure of air; outlet temperature and pressure of air; mass of heat exchanger fluid flow; inlet/outlet temperature and pressure of heat exchanger fluid; etc. Temperature controller data can also include data related to compressor 150, such as: compressor inlet air temperature and pressure; compressor outlet air temperature and pressure; and mass air flow rate. Vehicle operating data can include a vehicle speed, a load on the vehicle, etc. Memory 620 is configured to store the data acquired. As such, histories of acquired data and trends can be calculated by control system 140 via, e.g., processor 630.

Control system 140 is configured to receive various commands and instructions from an operator or user via operator input/output device 610. For example, based on the acquired data, an operator may choose a charge air temperature and enter a selection through operator input/output device 610. In this embodiment, control system 140 can control temperature controller 180 accordingly.

Control system 140 is configured to determine the charge air temperature needed in order to satisfy either an engine operating condition (e.g., an engine power output). Based on the desired charge air temperature, control system 140 controls operation of temperature controller 180. For example, control system 140 can actuate valve 148 in heating duct 137 to open, such that heating fluid is directed to a heat exchanger through which the air flows. In another example, processor 630 can instruct a valve 145 to direct the intake air only through bypass duct 135 because intake air is currently at the required charge air temperature. In another embodiment, control system 140 can open, close, and/or partially open one or more valves (e.g., valve 146) in one or more ducts (e.g., bypass duct 135, compressor duct 139, etc.) to effect a desired charge air temperature.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A vehicle, comprising:
an internal combustion engine;
an air intake passage coupled to the internal combustion engine and configured to intake air and supply the air to the engine;
a temperature controller coupled to the air intake passage and to the internal combustion engine, wherein the temperature controller includes:
a heat exchanger including a heating fluid configured to transfer heat to the air, wherein the heating fluid receives heat from an exhaust gas of the internal combustion engine;
a temperature adjustment duct configured to direct air from the air intake passage to the heat exchanger;
a bypass duct configured to direct air to the internal combustion engine at an ambient air temperature such that the air combusts at least partially in combination with a fuel; and
a valve located at a junction of the temperature adjustment duct and the bypass duct and configured to control a first portion of air flowing through the temperature adjustment duct and a second portion of air flowing through the bypass duct based on at least one of an engine power requirement and an intake air temperature;
a sensor configured to acquire and transmit engine operating data; and
a control system coupled to the air intake passage, the internal combustion engine, the temperature controller, and the sensor, wherein the control system is configured to:
receive engine operating data, and
control a temperature of the air based on the engine operating data via operation of the temperature controller to control an engine operating condition.

2. The vehicle of claim 1, wherein the engine operating condition includes a power output of the internal combustion engine at a substantially constant engine speed.

3. The vehicle of claim 1, wherein the engine operating data includes an indication of at least one of the temperature of the air, a mass flow rate of the air, and a pressure of the air; a speed of the internal combustion engine; an air-to-fuel ratio for a cylinder of the internal combustion engine; a likelihood of the internal combustion engine knocking; a load on the engine; and a manifold absolute pressure.

4. The vehicle of claim 1, wherein the air flows from the air intake passage to the internal combustion engine via the heat exchanger.

5. The vehicle of claim 1, wherein the heat exchanger includes a cooling fluid configured to remove heat from the air.

6. The vehicle of claim 5, wherein the control system controls the temperature of the air by varying a flow of the cooling fluid through the heat exchanger.

7. The vehicle of claim 5, wherein the cooling fluid includes a portion of air cooled by an evaporator coil in the vehicle.

8. The vehicle of claim 1, wherein the control system controls the temperature of the air by varying a flow of the heating fluid through the heat exchanger.

9. The vehicle of claim 1, wherein the control system is configured to increase the flow of heating fluid and air through the heat exchanger to add heat to the air.

10. The vehicle of claim 1, wherein the heating fluid includes an intermediate fluid.

11. The vehicle of claim 1, wherein the heating fluid includes at least one of a coolant and a lubricant of the internal combustion engine.

12. The vehicle of claim 1, wherein the heat exchanger uses a dedicated cooling fluid and a dedicated heating fluid.

13. An internal combustion engine system, comprising:
an air intake passage coupled to an internal combustion engine and configured to intake air and provide the air to the internal combustion engine;
a temperature controller coupled to the air intake passage and the internal combustion engine, wherein the temperature controller includes:
a compressor;
a heat exchanger;
a temperature adjustment duct configured to direct air from the air intake passage to at least one of the compressor and the heat exchanger;
a bypass duct configured to direct air to the internal combustion engine at an ambient air temperature such that the air combusts at least partially in combination with a fuel; and
a valve located at a junction of the temperature adjustment duct and the bypass duct and configured to control a first portion of air flowing through the temperature adjustment duct and a second portion of air flowing through the bypass duct based on at least one of an engine power requirement and an intake air temperature;
a sensor configured to acquire and transmit engine operating data; and
a control system coupled to the sensor, the temperature controller, the air intake passage, and the internal combustion engine, wherein the control system is configured to:
receive engine operating data, and control a temperature of the air based on the engine operating data via operation of the temperature controller to control an engine operating condition.

14. The system of claim 13, wherein the heat exchanger is configured to add or remove heat from the air.

15. The system of claim 13, wherein the control system is configured to control operation of the temperature controller such that the air flows from the air intake passage to the internal combustion engine via at least one of the compressor and the heat exchanger.

16. The system of claim 13, wherein the control system is configured to control the temperature of the air by varying a flow of the air through the heat exchanger.

17. The system of claim 13, wherein the heat exchanger includes a cooling fluid configured to remove heat from the air.

18. The system of claim 13, wherein the heat exchanger includes a heating fluid configured to transfer heat to the air.

19. A system for controlling intake air temperature in an internal combustion engine, comprising:
  a temperature controller, wherein the temperature controller includes:
    a heat exchanger including a heating fluid configured to transfer heat to the air, wherein the heating fluid is an exhaust gas of the internal combustion engine;
    a temperature adjustment duct configured to direct air to the heat exchanger;
    a bypass duct configured to direct air to an internal combustion engine at an ambient air temperature such that the air combusts at least partially in combination with a fuel; and
    a valve located at a junction of the temperature adjustment duct and the bypass duct and configured to control a first portion of air flowing through the temperature adjustment duct and a second portion of air flowing through the bypass duct based on at least one of an engine power requirement and an intake air temperature;
  a sensor configured to acquire and transmit engine operating data; and
  a control system coupled to the temperature controller and the sensor, wherein the control system is configured to:
    receive the engine operating data for the internal combustion engine;
    receive an operating preference for the internal combustion engine; and
    control operation of the temperature controller based on the engine operating data and the operating preference.

20. The system of claim 19, further comprising an operator input/output device configured to allow an operator to input an operating preference for the vehicle and receive information regarding the engine.

21. The system of claim 19, wherein the operating preference includes a power output of the engine.

22. The system of claim 19, wherein the control system includes a processor, wherein the processor is configured to determine an intake air temperature necessary to achieve the operating preference based on the engine operating data.

23. The system of claim 19, wherein the temperature controller includes a heating fluid valve and a cooling fluid valve.

24. The system of claim 23, wherein the control system is configured to vary a first flow of the heating fluid via actuation of the heating fluid valve and a second flow of a cooling fluid through the temperature controller via actuation of the cooling fluid valve.

25. The system of claim 19, wherein the temperature controller includes a heating duct.

26. The system of claim 25, wherein the heating duct is configured to direct the heating fluid to the heat exchanger.

27. The system of claim 19, wherein the temperature controller includes a cooling duct.

28. The system of claim 27, wherein the cooling duct is configured to direct a cooling fluid to the heat exchanger.

* * * * *